US012657638B2

(12) United States Patent
Ghiasi et al.

(10) Patent No.: US 12,657,638 B2
(45) Date of Patent: Jun. 16, 2026

(54) ESTIMATING DeltaV FROM IMAGES

(71) Applicant: CCC Intelligent Solutions Inc.,
Chicago, IL (US)

(72) Inventors: Zia Ghiasi, Chicago, IL (US); **Taha
Khademinejad,** Naperville, IL (US);
Surendran Narayanamoorthy, Aurora,
IL (US); **Mohamad Reza
Rooholamini,** Chicago, IL (US)

(73) Assignee: CCC Intelligent Solutions Inc.,
Chicago, IL (US)

( * ) Notice: Subject to any disclaimer, the term of this
patent is extended or adjusted under 35
U.S.C. 154(b) by 287 days.

(21) Appl. No.: 18/240,103

(22) Filed: Aug. 30, 2023

(65) Prior Publication Data

US 2025/0078285 A1    Mar. 6, 2025

(51) Int. Cl.
G06Q 40/08 (2012.01)
G06T 7/00 (2017.01)
G06T 7/246 (2017.01)

(52) U.S. Cl.
CPC ....... G06Q 40/0841 (2025.08); G06T 7/0002
(2013.01); G06T 7/246 (2017.01)

(58) Field of Classification Search
CPC .... G06Q 40/0841; G06T 7/0002; G06T 7/246
See application file for complete search history.

(56) References Cited

U.S. PATENT DOCUMENTS

2007/0288135 A1* 12/2007 Kidd ................. G01M 17/0078
701/31.4
2020/0090429 A1* 3/2020 Navarrete .............. G07C 5/008

* cited by examiner

*Primary Examiner* — Casey L Kretzer
(74) *Attorney, Agent, or Firm* — LOEB & LOEB LLP

(57) ABSTRACT

An artificial intelligence (AI) deep learning model in an
estimator may be trained by inputting the photos of known
accidents to create a trained model. The trained model in the
estimator may take First Notice of Loss (FNOL) data to
predict the value of DeltaV and PDoF for a plurality of
objects in a new accident.

19 Claims, 5 Drawing Sheets

Longitudinal ΔV

110　ACCEPTING A PLURALITY OF IMAGES OF AN OBJECT AND RELATED CHANGE IN VELOCITY DATA APPLIED TO THE OBJECT

125　REQUEST ADJUSTED IMAGES

120　IMAGES SCORE OVER THRESHOLD?

130　SUBMITTING THE IMAGES AND RELATED CHANGE IN VELOCITY DATA TO A LEARNING ALGORITHM

Longitudinal ΔV

Total ΔV

PDOF

Lateral ΔV

ESTIMATING DeltaV FROM IMAGES

BACKGROUND

Photographs of a damaged objects are one of the earliest forms of documentation of an accident. Insurance adjusters and actuaries rely on change in velocity of the object from an impact data or DeltaV measurements, often obtained through Event Data Recorders (EDR) or accident reconstruction techniques and analysis, to estimate the potential damages and associated costs. DeltaV information may be a 2D vector with two components: longitudinal (aligned with the direction of the vehicle) and lateral (perpendicular to the direction of the vehicle). This information helps insurers assess risk, set premiums, and make informed decisions when handling auto property damage (APD) and casualty claims. The specific details and methodologies used may vary, and each methodology may have their own proprietary models and formulas for assessing damages and determining liability.

Although change in velocity data or DeltaV data is an important piece of information in APD and casualty claims, it is not always available because either the vehicle does not have data recorder devices, or the data is not accessible. While the telematics information may not be available, the photos of the damaged vehicles are usually available. It would be useful to predict the value and the direction of the DeltaV using photos including the DeltaV for a plurality of objects in an accident captured in the images.

SUMMARY

An artificial intelligence (AI) deep learning model may be trained by inputting photos of accidents and related change in velocity of the object from an impact data or DeltaV data. The resulting model may be used to predict the value of DeltaV and Principal Direction of Force (PDOF) for a plurality of objects from new first notice of loss (FNOL) photos. A large database of 100+ thousand accidents may be used to build a model for predicting DeltaV and PDOF values from images. For each accident, multiple photos of the damaged vehicles, as well as the DeltaV and PDOF values, may be available. The DeltaV and PDOF may be obtained either from the EDR device mounted in the vehicle or generated by a computer using the measurements of the damage depth and the physical properties of the vehicle (such as stiffness, curb weight, height, etc.). Other information about the vehicle, such as make, model, year of the vehicle, airbag deployment flag, primary and secondary impact points, odometer reading, and drivability flag may also be available.

Understanding the impact severity has always been a missing piece for casualty adjusters when investigating injuries. The Photo DeltaV model (PDV) may provide a value for DeltaV which represents the extent of impact severity as well as Principal Direction of Force (PDoF). By predicting DeltaV from a photograph without human intervention, the DeltaV measure may accelerate informed decisions in the vehicle repair and injury claim processes, thus reducing the time and cost of adjudicating these claims. In addition, the system and method may determine the PDoF and DeltaV for multiple vehicles that were involved in an incident.

Figure 1:
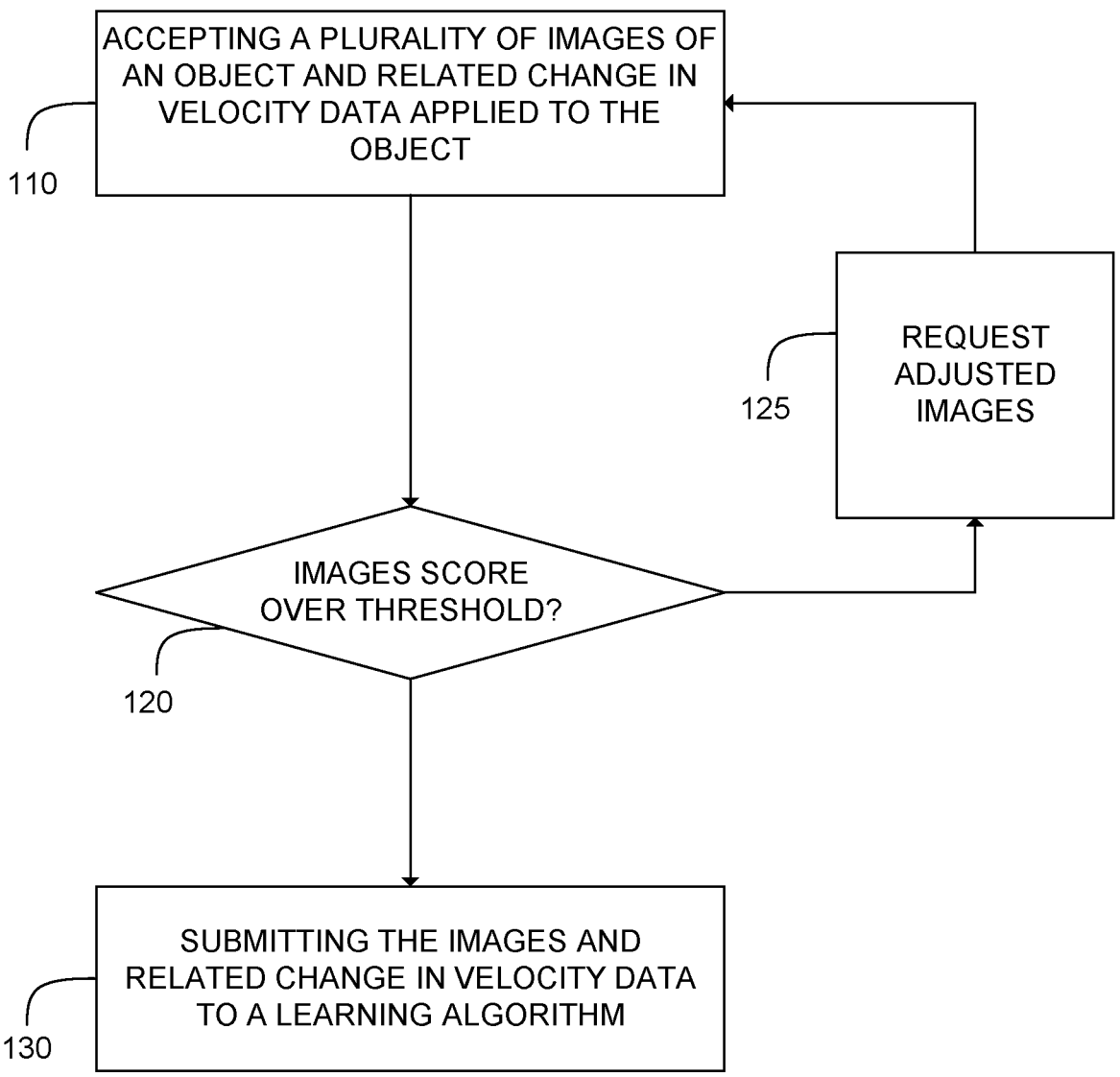
FIG. 1 may illustrate blocks of a method in accordance with the claims.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

SPECIFICATION

The present claimed system and method may overcome the limitations of the previous systems by providing a system to turn ordinary accident images into DeltaV estimates and PDoF determinations. All dimensions specified in this disclosure may be by way of example only and are not intended to be limiting. Further, the proportions shown in these Figures may not be necessarily to scale. As will be understood, the actual dimensions and proportions of any system, any device or part of a system or device disclosed in this disclosure may be determined by its intended use.

Methods and devices that may implement the embodiments of the various features of the invention will now be described with reference to the drawings. The drawings and the associated descriptions may be provided to illustrate embodiments of the invention and not to limit the scope of the invention. Reference in the specification to "one embodiment" or "an embodiment" may be intended to indicate that a particular feature, structure, or characteristic described in connection with the embodiment may be included in at least an embodiment of the invention. The appearances of the phrase "in one embodiment" or "an embodiment" in various places in the specification may not necessarily be referring to the same embodiment.

Throughout the drawings, reference numbers may be re-used to indicate correspondence between referenced elements. In addition, the first digit of each reference number may indicate the FIG. where the element first appears.

As used in this disclosure, except where the context requires otherwise, the term "comprise" and variations of the term, such as "comprising", "comprises" and "comprised" may not be intended to exclude other additives, components, integers or steps.

In the following description, specific details may be given to provide a thorough understanding of the embodiments. However, it may be understood by one of ordinary skill in the art that the embodiments may be practiced without these specific details. Well-known circuits, structures and techniques may not be shown in detail in order not to obscure the embodiments. For example, circuits may be shown in block diagrams in order not to obscure the embodiments in unnecessary detail.

Also, it is noted that the embodiments may be described as a process that is depicted as a flowchart, a flow diagram, a structure diagram, or a block diagram. The flowcharts and block diagrams in the figures may illustrate the architecture, functionality, and operation of possible implementations of systems, methods and computer programs according to various embodiments disclosed. In this regard, each block in the flowchart or block diagrams may represent a module, segment, or portion of code, that may include one or more executable instructions for implementing the specified logical function(s). It should also be noted that, in some alternative implementations, the functions noted in the blocks may occur out of the order noted in the figures.

Although a flowchart may describe the operations as a sequential process, many of the operations may be performed in parallel or concurrently. In addition, the order of the operations may be rearranged. A process may be terminated when its operations are completed. A process may correspond to a method, a function, a procedure, a subroutine, a subprogram, etc. When a process corresponds to a function, its termination may correspond to a return of the function to the calling function or the main function. Additionally, each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

Moreover, a storage may represent one or more devices for storing data, including read-only memory (ROM), random access memory (RAM), magnetic disk storage mediums, optical storage mediums, flash memory devices and/or other non-transitory machine readable mediums for storing information. The term "machine readable medium" may include, but is not limited to portable or fixed storage devices, optical storage devices, wireless channels and various other non-transitory mediums capable of storing, comprising, containing, executing or carrying instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). One or more than one processor may perform the necessary tasks in series, distributed, concurrently or in parallel. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc. and are also referred to as an interface, where the interface is the point of interaction with software, or computer hardware, or with peripheral devices.

Referring to FIG. 1, a method of determining an object's change in velocity or DeltaV from one or more images of the object may be illustrated. The object may be a vehicle or a boat, a piece of jewelry or a snowmobile any other piece of property that may be damaged In some embodiments, the object may insured. At block 110, at least one or more images of an object may be received. The images may be in an electronic format and may be communicated electronically. The images may be received by a server or other electronic device that has the ability to receive a large amount of data from a large number of sources. The server may be a single server or may be a plurality of servers as will be explained.

At block 120, the system may determine if the images received meet a criteria. The criteria may be many and varied depending on the object, the number of images and the quality of the images. For example, a single image that only partially shows damage to a vehicle may not meet the criteria. In another example, many images may be received but the images may not be clear and these images may not meet the criteria. In other situations, a single image may show the damage in sufficient detail such as a dent in a door. Thus, the criteria may be flexible based on the damage and the object.

In some embodiments, the criteria may be based on a scoring of the images. The scoring may be based on the number of images, the quality of the images, the detail of the images and type of damages. The scoring may be compared to a threshold and if the scored images are over a threshold, the method may proceed to block 130. In other embodiments, the scoring may be below a threshold and the method may communicate a method to the person submitting the images that more or better images are required and the method may return to block 110.

At block 130, a learning algorithm may be used to estimate a change of the objects velocity indicated by the at least one or more images. When a vehicle has a change in velocity such as when it is in an accident, damage to the vehicle may occur. In the insurance industry, DeltaV may refer to a change in velocity that occurs during an accident or collision. DeltaV may be a factor in assessing the severity of an incident and its potential impact on individuals involved. DeltaV may play role in both auto property damage (APD) claims and casualty claims.

Auto Property Damage (APD) Claims: DeltaV may help determine the extent of damage to vehicles involved in an accident. It may be a measure of the damage energy transferred during a collision and may be correlated with the force of impact. A higher DeltaV may imply a more severe accident, which may lead to greater property damage to the vehicles involved. Insurance companies may use this information to assess the cost of repairs or declare a vehicle a total loss.

Casualty Claims: DeltaV may also be relevant in casualty claims, which involve injuries or fatalities resulting from an accident. The severity of injuries may be influenced by the DeltaV experienced by the individuals involved. Higher DeltaV values often indicate more forceful impacts, increasing the likelihood of severe injuries or even fatalities. Insurance companies may consider DeltaV data alongside medical reports and other evidence to evaluate the extent of bodily injuries, determine liability, and settle claims.

Figure 3:
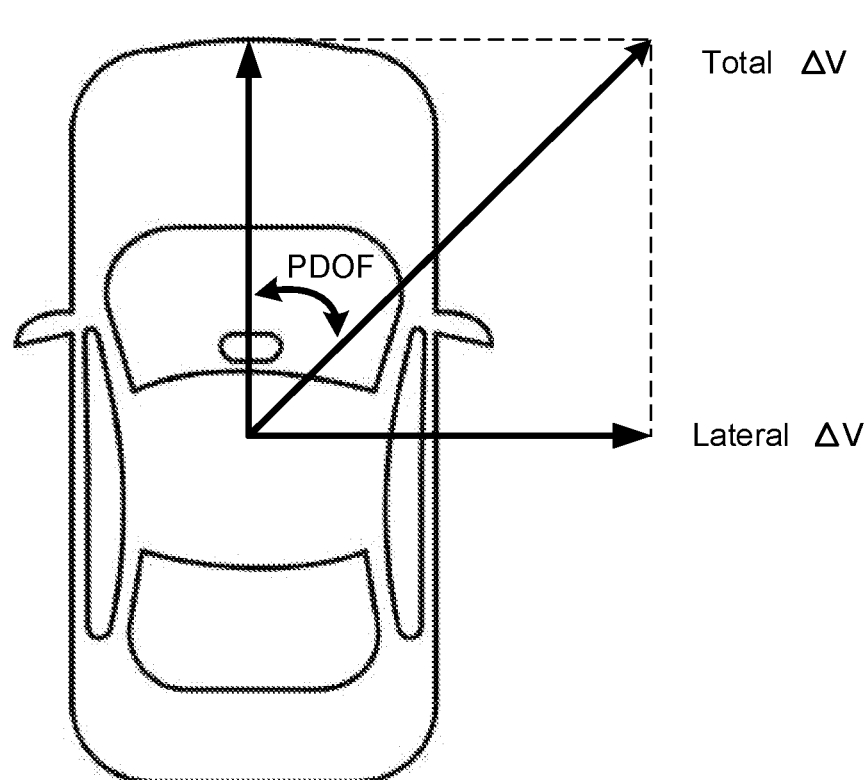
FIG. 3 may illustrate vectors that go into DeltaV.

Velocity is a two-dimensional (2D) vector. DeltaV is also a 2D vector with two components: longitudinal (aligned with the direction of the vehicle) and lateral (perpendicular to the direction of the vehicle). These two components, along with the magnitude of the DeltaV vector, may be the variables of interest and may all be positive numbers. As illustrated in FIG. 3, principle direction of force (PDOF)

may be defined as the angle between the longitudinal axis (front) of the vehicle and the head of DeltaV vector increasing clockwise.

Although DeltaV may be an important piece of information in APD and casualty claims, it is not always available because either the vehicle may not have data recorder devices, or the data may not be accessible. While the telematics information may not be available, the photos of the damaged vehicles are usually available to the insurance companies. The method is used to predict the DeltaV value and the direction of the DeltaV using photos through a learning algorithm such as deep neural network (DNN) including the DeltaV for a plurality of objects in an accident in an image. Traditionally DeltaV measurements, often obtained through Event Data Recorders (EDR) or accident reconstruction techniques, therefore, the concept of predicting DeltaV from images is new in the insurance industry.

Figure 2:
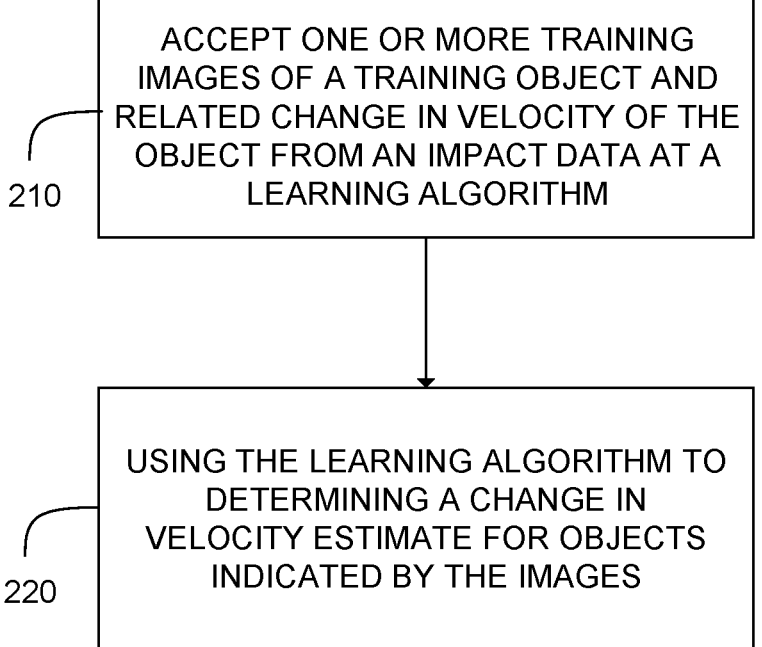
FIG. 2 may illustrate blocks of a method in accordance with the claims.

Referring to FIG. 2, the use of the learning algorithm may be described. At block 210, the method may accept one or more training images of a training object and related change in velocity of the object from an impact data. In some embodiments, the change in velocity of the object from an impact data may be obtained from an electronic data recording device in the object. In other embodiments, the change in velocity of the object from an impact data may be determined using a measurement of damage depth and physical properties of the object.

At block 220, the one or more training images and related change in velocity of the object from impact data or DeltaV may be communicated to an estimator which may include a computer based learning algorithm. For example, a large database of thousands of accidents may be used to build a model for predicting change in velocity of the object from an impact or DeltaV and PDoF values from the images. For each accident, multiple photos of the damaged vehicle, as well as the change in velocity of the object from an impact or DeltaV and PDoF values, may be available to the estimator to train the learning algorithm. FIG. 3 may be an illustration of PDoF and the vectors used to determine PDoF. The DeltaV and PDoF may be obtained either from the EDR device mounted in the vehicle or generated by a computer using the measurements of the damage depth and the physical properties of the vehicle (such as stiffness, curb weight, height, etc.). Other information about the vehicle, such as make, model, year of the vehicle, airbag deployment flag, primary and secondary impact points, odometer reading, and drivability flag may also be available and may be used by the model.

At block 230, the computer based trained learning algorithm in the estimator may be used to predict the change in velocity of the object from images. Thus, images of a recent accident may be submitted to the estimator. The estimator may review the images, turn the image into data that can be used to estimate the DeltaV of accidents.

Turning the images into data may entail taking measurements of different points on the object. The points may be compared to baseline of measurements for the object and the changes may be noted. The system may then analyze the changes to determine the extent of damage.

Figure 5:
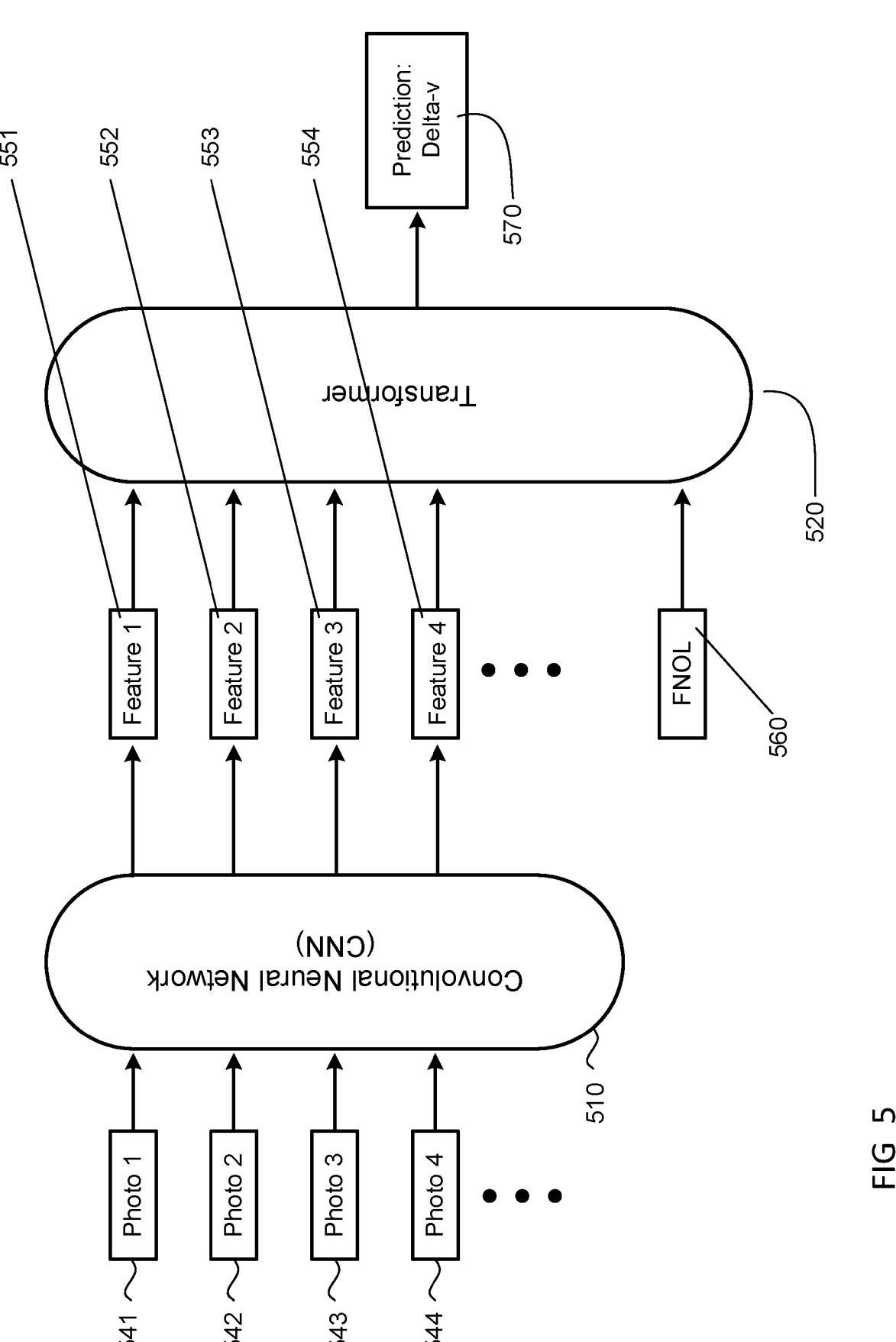
FIG. 5 may illustrate flows through the learning module.

More specifically, referring to FIG. 5, the learning algorithm in the estimator may include a convolutional neural network 510 (CNN) and a transformer 520 which may be a type of estimator. There may be other ways of enabling the estimator and the estimator should not be limited to a transformer 520. Other ways of creating a model in the estimator are possible and are contemplated. In one embodiment, the CNN 510 may determine one or more features 551-554 in each photo 541-544. In one example, the CNN may determine the features 551-554 which may be a set of numbers but the amount of features 551-554 may be varied up or down depending on many factors.

The CNN in the estimator may be trained on millions of images of damaged vehicles and may have learned to understand the bodily damage on the vehicle from the photos. This CNN may be novel because it has been created and trained on known images only. Logically, other types of learning algorithms in the estimator may be used. For example, the learning algorithm may be a fully connected neural network (FCN) in one embodiment. The analysis of the features may indicate the changes to the vehicle as a result of an accident or other damage.

In training, the transformer 520 may take the features 551-554 of multiple images 541-544 of the same vehicle (the outputs of the CNN) as well as the first notice of loss (FNOL) information 560 to create a model. Once the model is trained, the transformer may generate predictions of the change of velocity of an object or DeltaV 570. In some embodiments, the estimation of DeltaV 570 may be in real time. The transformer 520 used in this invention may be trained on a dataset specifically created for predicting DeltaV 570.

The trained model which may be in the transformer 520 of the estimator may take the features of multiple images 541-544 of the same object as well as first notice of loss information (FNOL) in order to predict the change in velocity of DeltaV of the object. The learning algorithm also may analyze one or more of; a make of an object, a model of the object, a year of the object, whether an airbag was deployed on the object, a primary impact point, a secondary impact point, an odometer reading and a drivability flag.

DeltaV may indicate a change in the object's velocity and a PDOF. Breaking DeltaV down further as illustrated in FIG. 3, DeltaV may be made up of a first vector in the direction of travel (longitude) and a second vector perpendicular to the direction of travel (lateral). DeltaV also may have a magnitude. Logically, any DeltaV estimate may include a vector and the PDoF may be the angle between the longitudinal axis of the front of the object and the head of the DeltaV vector increasing clockwise and the DeltaV estimate may include a DeltaV value and a PDoF value.

In an additional aspect, the system and method may use the physics concept of the conservation of momentum to estimate the DeltaV for additional vehicles that may have been involved in an accident. At a high level, momentum may be defined as mas multiplied by velocity. Momentum may be a vector quantity that may depend on the direction of the object. The conservation of momentum states that, within some problem domain, the amount of momentum remains constant; momentum is neither created nor destroyed, but only changed through the action of forces as described by Newton's laws of motion. When two objects collide the total momentum before the collision is equal to the total momentum after the collision (in the absence of external forces). In an accident, the momentum created by the collision may be shared among the vehicles in the accident.

In an additional aspect, the momentum of the vehicles before and after the accident and images of the vehicles that were part of the collision may be analyzed by the system and the DeltaV for each vehicle may be determined. When there are more than one vehicles, the total momentum of the accident may be determined as the mass and velocity of the vehicles before and after the accident may be known. In other instances, velocity may be determined using the described system and method. As a result, the DeltaV for more than one vehicle in an accident may be estimated.

In another aspect, the system and method may also determine the PDoF for one or more of the vehicles in the accident. Previous systems may analyze points of impact but the PDoF is more useful in many respects in determining damage to the vehicle or injuries to passengers.

The outputs of the estimator may be used for a variety of practical purposes. For example, the model aspect of the estimator may predict impact severity to occupants of the object and also may predict casualty risk and claims. Logically, the model aspect of the estimator may predict an estimate of damage to the object and may also make a total or repair decision.

The system and method may also be useful in anticipating claims, the types of claims and the severity of the claims. For example, an accident with a high DeltaV with multiple vehicles may result in medical claims and damage claims from multiple parties. In this situation, a carrier may be proactive in pursuing medical information and starting the process to compensate any injuries that may have occurred.

In another aspect, the DeltaV may be useful to determine the experience of an agent to handle a claim. If an accident has a low DeltaV, a newer agent may be able to handle the claim. If the accident had a high DeltaV and involved multiple cars, a more experienced agent may be required.

Figure 4:
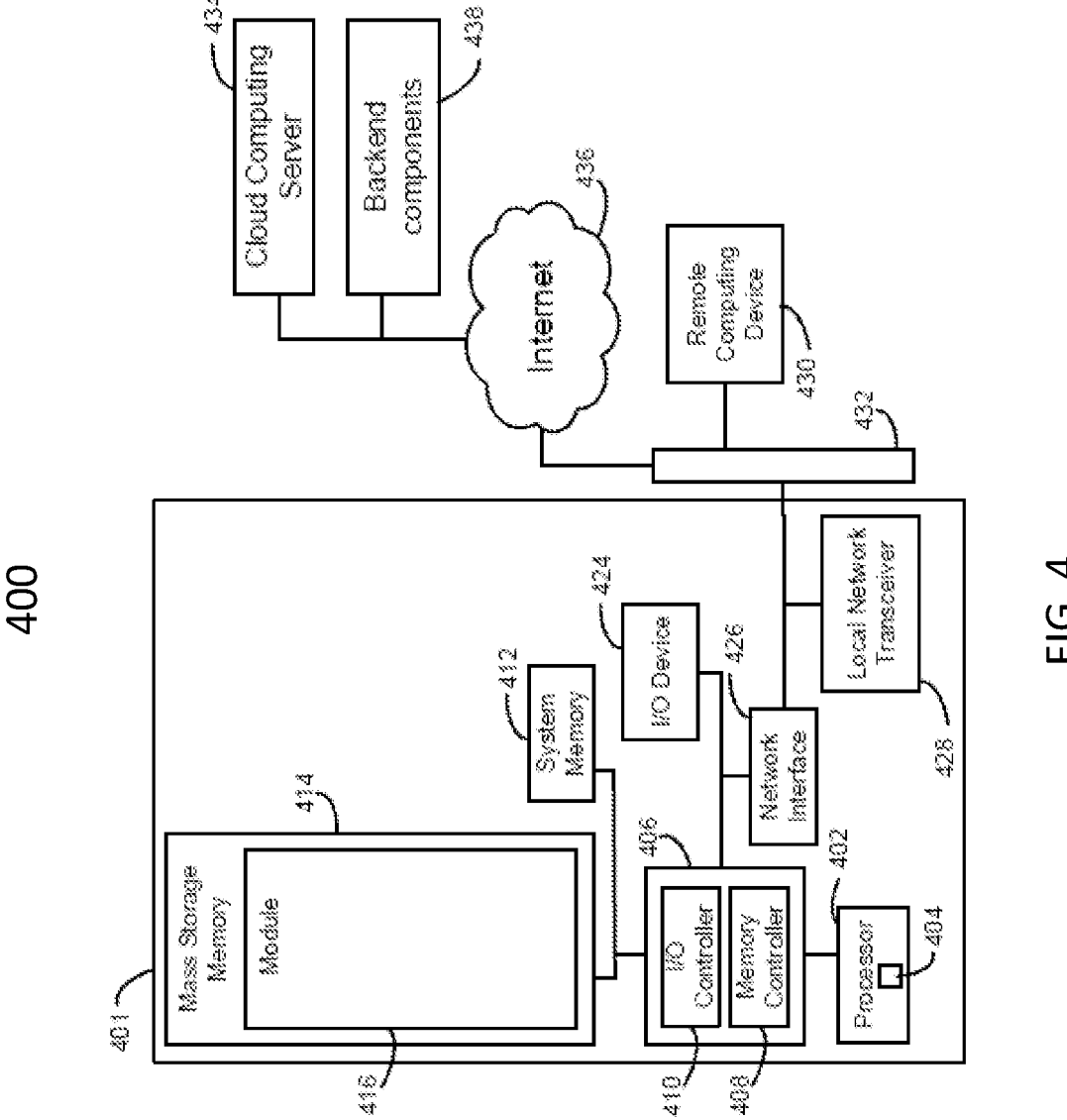
FIG. 4 may illustrate hardware used by the system.

FIG. 4 may be a high-level block diagram of an example computing environment 400 for the system 100 and methods (e.g., method in FIGS. 1 and 2) as described herein. The computing device 400 may include a server, a mobile computing device, a cellular phone, a tablet computer, an electronic reader, a virtual reality headset, an artificial reality headset, a Wi-Fi-enabled device or other personal computing device capable of wireless or wired communication, a thin client, or other known type of computing device. Logically, the computing device 400 may be designed and built to specifically execute certain tasks.

As will be recognized by one skilled in the art, in light of the disclosure and teachings herein, other types of computing devices can be used that have different architectures. Processor systems similar or identical to the example systems and methods described herein may be used to implement and execute the example systems and methods described herein. Although the example system 400 is described below as including a plurality of peripherals, interfaces, chips, memories, etc., one or more of those elements may be omitted from other example processor systems used to implement and execute the example systems and methods. Also, other components may be added.

As shown in FIG. 4, the computing device 401 may include a processor 402 that is coupled to an interconnection bus. The processor 402 may include a register set or register space 404, which is depicted in FIG. 4 as being entirely on-chip, but which could alternatively be located entirely or partially off-chip and directly coupled to the processor 402 via dedicated electrical connections and/or via the interconnection bus. The processor 402 may be any suitable processor, processing unit or microprocessor. Although not shown in FIG. 4, the computing device 401 may be a multi-processor device and, thus, may include one or more additional processors that are identical or similar to the processor 402 and that are communicatively coupled to the interconnection bus.

The processor 402 of FIG. 4 may be coupled to a chipset 406, which includes a memory controller 408 and a peripheral input/output (I/O) controller 410. As is well known, a chipset may typically provide I/O and memory management functions as well as a plurality of general purpose and/or special purpose registers, timers, etc. that are accessible or used by one or more processors coupled to the chipset 406. The memory controller 408 may perform functions that enable the processor 402 (or processors if there are multiple processors) to access a system memory 412 and a mass storage memory 414, that may include either or both of an in-memory cache (e.g., a cache within the memory 412) or an on-disk cache (e.g., a cache within the mass storage memory 414).

The system memory 412 may include any desired type of volatile and/or non-volatile memory such as, for example, static random access memory (SRAM), dynamic random access memory (DRAM), flash memory, read-only memory (ROM), etc. The mass storage memory 414 may include any desired type of mass storage device. For example, the computing device 401 may be used to implement a module 416 (e.g., the various modules as herein described). The mass storage memory 414 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 401, the systems and methods described herein. Thus, a module, block, function, operation, procedure, routine, step, and method can be implemented in hardware, firmware, and/or software.

In one embodiment, program modules and routines may be stored in mass storage memory 414, loaded into system memory 412, and executed by a processor 402 or may be provided from computer program products that are stored in tangible computer-readable storage mediums (e.g. RAM, hard disk, optical/magnetic media, etc.).

The peripheral I/O controller 410 may perform functions that enable the processor 402 to communicate with a peripheral input/output (I/O) device 424, a network interface 426, a local network transceiver 428, (via the network interface 426) via a peripheral I/O bus. The I/O device 424 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 424 may be used with the module 416, etc., to receive data from the transceiver 428, send the data to the components of the system 100, and perform any operations related to the methods as described herein. The local network transceiver 428 may include support for a Wi-Fi network, Bluetooth, Infrared, cellular, or other wireless data transmission protocols. In other embodiments, one element may simultaneously support each of the various wireless protocols employed by the computing device 401. For example, a software-defined radio may be able to support multiple protocols via downloadable instructions. In operation, the computing device 401 may be able to periodically poll for visible wireless network transmitters (both cellular and local network) on a periodic basis. Such polling may be possible even while normal wireless traffic is being supported on the computing device 401. The network interface 426 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 408 and the I/O controller 410 are depicted in FIG. 4 as separate functional blocks within the chipset 406, the functions performed by these blocks may be integrated within a single integrated circuit or may be implemented using two or more separate integrated circuits. The computing environment 400 may also implement the module 416 on a remote computing device 430. The remote computing device 430 may communicate with the computing device 401 over an Ethernet link 432. In some embodiments, the module 416 may be retrieved by the computing device 401 from a cloud computing server 434 via the Internet 436. When using the cloud computing server 434, the retrieved module 416 may be programmatically linked with the computing device 401. The module 416 may be a collection of various software playgrounds including artificial intelligence software and document creation software or may also be a Java® applet executing within a Java® Virtual Machine (JVM) environment resident in the computing device 401 or the remote computing device 430. The module 416 may also be a "plug-in" adapted to execute in a web-browser located on the computing devices 401 and 430. In some embodiments, the module 416 may communicate with back end components 438 via the Internet 436.

The system 400 may include but is not limited to any combination of a LAN, a MAN, a WAN, a mobile, a wired or wireless network, a private network, or a virtual private network. Moreover, while only one remote computing device 430 is illustrated in FIG. 6 to simplify and clarify the description, it is understood that any number of client computers may be supported and may be in communication within the system 400.

Additionally, certain embodiments may be described herein as including logic or a number of components, modules, blocks, or mechanisms. Modules and method blocks may constitute either software modules (e.g., code or instructions embodied on a machine-readable medium or in a transmission signal, wherein the code is executed by a processor) or hardware modules. A hardware module may be a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" may be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" may refer to a hardware module. Considering embodiments in which hardware modules are temporarily configured (e.g., programmed), each of the hardware modules need not be configured or instantiated at any one instance in time. For example, where the hardware modules include a processor configured using software, the processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification may be presented in terms of algorithms or symbolic representations of operations on data stored as bits or binary digital signals within a machine memory (e.g., a computer memory). These algorithms or symbolic representations may be examples of techniques used by those of ordinary skill in the data processing arts to convey the substance of their work to others skilled in the art. As used herein, an "algorithm" may be a self-consistent sequence of operations or similar processing leading to a desired result. In this context, algorithms and operations may involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, may be merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "embodiments," "some embodiments" or "an embodiment" or "teaching" may mean that a particular element, feature, structure, or characteristic described in connection with the embodiment is included in at least one embodiment. The appearances of the phrase "in some embodiments" or "teachings" in various places in the specification may not necessarily all be referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments may not be limited in this context.

Further, the figures depict preferred embodiments for purposes of illustration only. One skilled in the art may be readily recognize from the following discussion that alternative embodiments of the structures and methods illustrated herein may be employed without departing from the principles described herein.

Upon reading this disclosure, those of skill in the art may appreciate still additional alternative structural and functional designs for the systems and methods described herein through the disclosed principles herein. Thus, while particular embodiments and applications have been illustrated and described, it is to be understood that the disclosed embodiments may not be limited to the precise construction and components disclosed herein. Various modifications, changes and variations, which may be apparent to those skilled in the art, may be made in the arrangement, operation and details of the systems and methods disclosed herein without departing from the spirit and scope defined in any appended claims.

The invention claimed is:

1. A method of determining a plurality of objects' change in velocity from one or more images of the objects comprising:

receiving at least one or more images of the objects;

submitting the at least one or more images of the objects to an estimator;

using the estimator to:

estimate change of each of the object's velocity indicated by the at least one or more images wherein the estimator:

accepts one or more training images of a training object and related change in velocity of the training object from impact data; and submits the one or more training images and related change in velocity of the training object from impact data to a computer based learning algorithm to train the estimator to predict an object's change in velocity from one or more images of the object wherein the estimated change of velocity comprises a DeltaV estimate wherein Delta V indicates a change in the object's velocity and a principle direction of force (PDoF).

2. The method of claim 1, wherein the estimator determines features for each of the training images and related change in velocity of the training object from impact data.

3. The method of claim 1, wherein the estimator determines features of the at least one or more images.

4. The method of claim 3, wherein the estimator uses the features determined for the at least one or more images to predict an object's change in velocity from one or more images of the object.

5. The method of claim 1 wherein the estimator further comprises determining a measure of damage to the object indicated by the one or more images.

6. The method of claim 1, wherein the DeltaV estimate comprises a vector and the PDoF is the angle between the longitudinal axis of the front of the object and the head of the Delta V vector increasing clockwise.

7. The method of claim 1, further comprising predicting at least one of:

impact severity to occupants of the object;

casualty risk and claims;

an estimate of damage to the object; and a total or repair decision.

8. The method of claim 1, wherein the change in velocity of the object from an impact data is obtained from at least one of:

an electronic data recording device in the object; and using a measurement of damage depth and physical properties of the object.

9. The method of claim 8, wherein the physical properties of the object comprise one or more of a stiffness measure, a curb weight, a height, a length and a width.

10. The method of claim 1, wherein the learning algorithm analyzes one or more of a make of: an object, a model of the object, a year of the object, whether an airbag was deployed on the object, a primary impact point, a secondary impact point, an odometer reading and a drivability flag.

11. The method of claim 1, wherein the learning algorithm further comprises a convolutional neural network (CNN) and a transformer wherein the CNN determines one or more features in each image; and the transformer takes the features of multiple images of the same object as well as first notice of loss information (FNOL) in order to determine the predicted change in velocity of the object.

12. A non-transitory computer readable medium comprising computer executable instructions that physically configure a processor, the computer executable instruction comprising instructions for determining a DeltaV for objects from one or more images of the objects wherein DeltaV indicates a change in the object's velocity and a principle direction of force (PDoF) comprising:

receiving at least one or more images of the objects;

determining features of the at least one or more images;

submitting the at least one or more images of the objects and features determined to an estimator;

using the estimator to:

estimate change of each of the object's velocity indicated by the one or more images wherein the estimator:

accepts one or more training images of a training object and related change in velocity of the training object from impact data;

determines features for each of the one or more training images and related change in velocity of the training object from impact data and submits the one or more training images, related change in velocity of the training object from impact data and the features of the one or more training images to a computer based learning algorithm to train the estimator to predict an object's DeltaV from one or more images of the objects and the features determined for the at least one or more images.

13. The non-transitory computer readable medium of claim 12, wherein the learning algorithm further comprises a convolutional neural network (CNN) and a transformer.

14. The non-transitory computer readable medium of claim 13, wherein the CNN determines one or more features in each image.

15. The non-transitory computer readable medium of claim 13, wherein the transformer takes the features of multiple images of the same object as well as first notice of loss information (FNOL) in order to determine the model.

16. The non-transitory computer readable medium of claim 12, wherein the DeltaV estimate comprises a vector and the PDOF is the angle between the longitudinal axis of the front of the object and the head of the DeltaV vector increasing clockwise.

17. A computer system comprising:

a processor that is physically configured according to computer executable instructions, a memory in communication with the processor; and an input-output circuit in communication with the processor, the computer executable instruction comprising instructions for determining a DeltaV for a plurality of objects from one or more images of the object wherein DeltaV indicates a change in each of the object's velocity and a principle direction of force (PDoF) comprising:

receiving at least one or more images of the object;

determines features of the at least one or more images;

submitting the at least one or more images of the object and features determined to an estimator;

using the estimator to:

estimate change of the objects velocity indicated by the at the least one or more images wherein the estimator:

accepts one or more training images of a training object and related change in velocity of the training object from impact data;

determines features for each of the one or more training images and related change in velocity of the training object from impact data and submits the one or more training images, related change in velocity of the training object from impact data and the features of the one or more training images to a computer based learning algorithm to train the estimator to predict an object's DeltaV from one or more images of the object and the features determined for the at least one or more images.

18. The computer system of claim 17, wherein the learning algorithm further comprises a convolutional neural network (CNN) and a transformer wherein:

the CNN determines one or more features in each image; and the transformer takes the features of multiple images of the same object as well as first notice of loss information (FNOL) in order to determine the model.

19. The computer system of claim 17, wherein the DeltaV estimate comprises a vector and the PDOF is the angle between the longitudinal axis of the front of the object and the head of the DeltaV vector increasing clockwise.

* * * * *